United States Patent [19]

Finkenzeller et al.

[11] Patent Number: 4,973,134
[45] Date of Patent: Nov. 27, 1990

[54] READ-OUT APPARATUS FOR A LUMINESCENT STORAGE SCREEN

[75] Inventors: Johann Finkenzeller, Erlangen; Guenter Hubert, Baiersdorf, both of Fed. Rep. of Germany

[73] Assignee: Siemens Aktiengesellschaft, Berlin and Munich, Fed. Rep. of Germany

[21] Appl. No.: 332,494

[22] Filed: Apr. 3, 1989

[30] Foreign Application Priority Data

Jun. 21, 1988 [DE] Fed. Rep. of Germany ....... 3820938

[51] Int. Cl.⁵ .......................................... G01D 15/14
[52] U.S. Cl. ............................ 250/327.2; 250/484.1
[58] Field of Search ................ 250/327.2 J, 327.2 K, 250/484.1 B

[56] References Cited

U.S. PATENT DOCUMENTS 1,444,999  2/1923  Bennett et al. ...................... 198/592
4,417,260 11/1983  Kawai et al. ...................... 250/327.2

FOREIGN PATENT DOCUMENTS 0098574  1/1984  European Pat. Off. .
0098596  1/1984  European Pat. Off. .

*Primary Examiner*—Janice A. Howell
*Assistant Examiner*—Richard Harrig
*Attorney, Agent, or Firm*—Hill, Van Santen, Steadman & Simpson

[57] ABSTRACT

An apparatus for reading out the latent image stored in a luminescent storage screen includes a storage screen having a stimulible phosphor layer and a layer of magnetic material, a scanning system which conducts a line-by-line scanning of the screen with a scan beam so that the luminescent storage screen is induced to luminesce pixel-by-pixel, and a conveyor system for moving the storage screen through the scan beam which includes a magnetic drive drum at least in the region of the scan beam. The magnetic drum by interaction with the magnetic layer of the storage screen holds the screen in place during a line scan, and is then rotated to advance the screen for the next line scan.

3 Claims, 2 Drawing Sheets

READ-OUT APPARATUS FOR A LUMINESCENT STORAGE SCREEN

BACKGROUND OF THE INVENTION

1. Field of the Invention

The present invention is directed to devices for reading out a latent image from a luminescent storage screen, and in particular to such a device wherein the screen is scanned by a beam line-by-line, with the screen being advanced by a conveyor system for each line scan.

2. Description of the Prior Art

It is known in the art to latently store x-ray images in a luminescent storage screen. Such images are read-out of the storage screen by scanning the screen line-by-line with a scan beam of a radiation source which induces stimulation of the phosphor layer of the screen. The screen is induced to luminesce pixel-by-pixel. It is also known to advance the storage screen for each line scan, and to collect the light emitted by the luminescing screen over the entirety of its surface.

Such a read-out system is described in European application No. 0 098 596, wherein the storage screen additional includes a layer of magnetic material, and the screen is held on a continuous belt by a magnetic force. The belt has magnets integrated therein, which hold the storage screen on the belt by interaction with the layer of magnetic material. In another embodiment disclosed in this European application, a magnetic is provided which is disposed beneath the belt, so that the screen is pressed against the belt due to the force from the magnet. This type of apparatus, however, requires relatively complex manufacturing techniques, and it is difficult to precisely position the storage screen using this device, because the belt must be flexible so as to be entrainable around the turning rollers, and thus fluctuations in height occur during the forward feed of the belt.

SUMMARY OF THE INVENTION

It is a object of the present invention to provide a read-out apparatus for a luminescent storage screen wherein the screen is advanced from line scan-to-line scan by magnetic forces, which has a simple structure and which permits exact, three-dimensional positions of the screen at least in the region of the scanning.

The above object is achieved in accordance with the principles of the present invention in a read-out apparatus wherein the conveyor system includes a magnetic drive drum disposed in the region scanned by the scan beam, the magnetic drum interacting with a magnetic layer of the storage screen to advance the storage luminescent screen from line scan-to-line scan, as well as to hold the screen in place during a line scan. The drive drum is disposed at a fixed position, although of course being rotatable at that position. By fixing the position of the drive drum, the screen is held in a defined manner in height and laterally in the region of the scan beam, so that substantially no distortions of the image due to deviations in positioning of the screen result.

A simple structure of the drive drum consists of a shaft of non-magnetic material onto which a plurality of ring magnets are forced or plugged. The ring magnets are limited on each side by annular pole pieces. Spacers consisting of non-magnetic material are disposed between the pole pieces on the shaft. The drive shaft can be more easily manufactured if the pole pieces have a larger diameter than the ring magnets. The force of friction and thus synchronization and aligned precision, are enhanced in an embodiment wherein at least one filler of compressible material, which normally projects beyond the outer diameter of the pole pieces, is disposed between the pole pieces.

DESCRIPTION OF THE PREFERRED EMBODIMENTS

Figure 1:
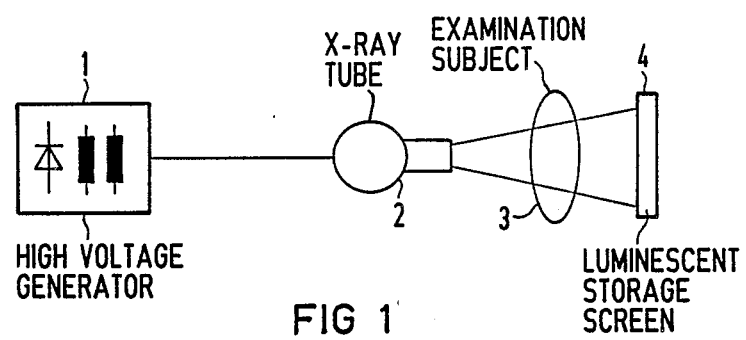
FIG. 1 is a schematic block diagram of an x-ray diagnostics installation for generating an image to latently stored in a luminescent screen.

A conventional x-ray diagnostics system is schematically illustrated in FIG. 1. This system includes a high voltage generator 1 which feeds an x-ray tube 2, which generates an x-ray beam in which an examination subject 3 is disposed. Radiation attenuated by the examination subject 3 is incident on a luminescent storage screen 4, and is latently stored in that screen. As is known, this latent image is stored by the generation of holes (in the electronic sense) which are stored in potential wells or traps.

Figure 2:
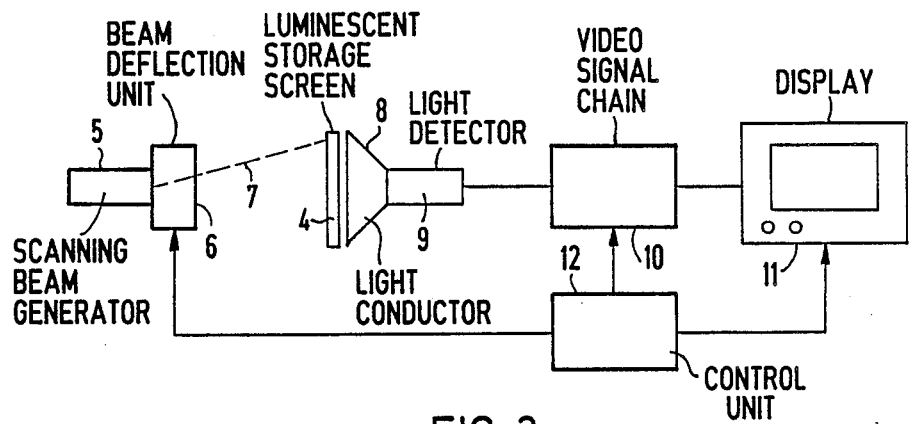
FIG. 2 is a schematic block diagram of a read-out system for a storage luminescent screen.

For reproducing the latent stored image a system of the type shown in FIG. 2 is conventionally used. Such a system includes a scanning beam generator 5, such as a laser, which generates a beam 7 which, when incident on the screen excites the holes stored in the potential wells, which thereafter fall back to a stable energy level, emitting light quanta corresponding to the energy difference.

To scan the entire surface of the screen 4, the scanning beam generator 5 operates in combination with a beam deflection unit 6, which deflects the scan beam 7 across the screen 4 line-by-line, with the screen being scanned pixel-by-pixel within each line. The beam deflection unit 6 may consist of a deflection mirror for vertical deflection. For scanning in the horizontal direction, however, the storage screen 4 is its self advanced line-by-line, using a conveyor system. A conveyor system for this purpose constructed in accordance with the principles of the present invention is shown in FIG. 3, discussed in detail below.

The light emitted by the storage screen 4 is incident on the input face of a light conductor 8, which conducts the emitted light onto a detector 9. The detector 9 is of the type known in the art which measures the brightness of the scanned picture elements and converts the measured value into an electrical signal.

The electrical signal is supplied to a video signal chain 10 which generates a video signal in a known manner for representation on a display 11. The video signal is obtained from the individual analog output signals of the detector 9. A control unit 12 synchronizes operation of the beam deflection unit 6, the video signal chain 10, and the display 11. As is known, the video signal chain 10 may include image memories, a processing circuit, and suitable transducers.

Figure 3:
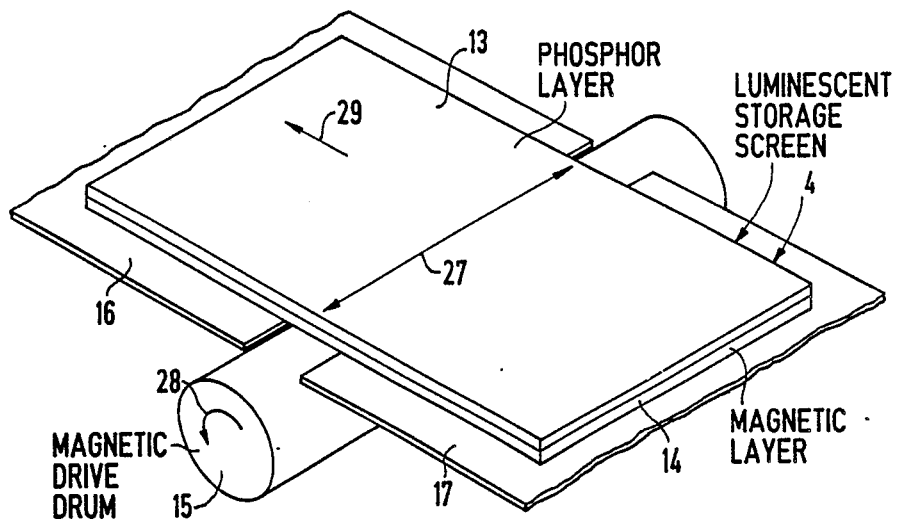
FIG. 3 is a perspective schematic view of a read-out apparatus for a storage luminescent screen constructed in accordance with the principles of the present invention.

A conveyor system constructed in accordance with the principles of the present invention, which can be used in the conventional read-out system shown in FIG. 2, is shown in detail in FIG. 3. The storage luminescent screen has a two-layer structure. A top phosphor layer 13 is directly exposed to the scan beam 7 during read-out, and is scanned line-by-line by the scan beam 7 as schematically indicated by the arrow 27. The phosphor layer 13 covers a layer 14 consisting of magnetic material, for example sheet steel. A drive drum 15 also consisting of magnetic material holds the storage screen 4 in place in the region of the line scanning by the scan beam 7, with the screen 4 being pressed or pulled against the drive drum 15 by the magnetic integration of the drive drum 15 with the layer 14.

Figure 4:
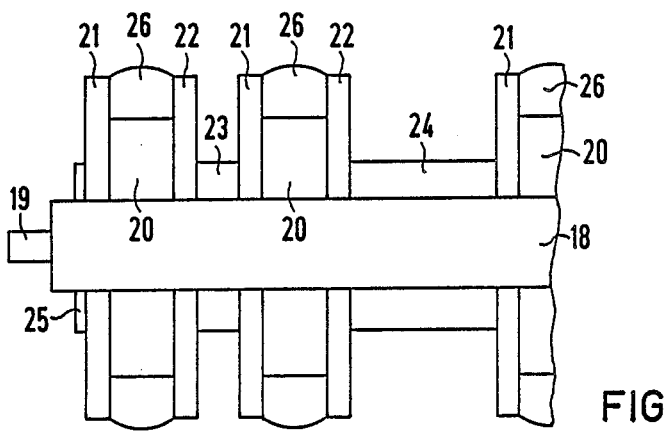
FIG. 4 is a sectional view of the drive drum of the apparatus shown in FIG. 3, constructed in accordance with the principles of the present invention.

After conclusion of the scanning of a line, the drive drum 15 is rotated step-by-step in the direction of arrow 28, so that the screen 4 is advanced in the direction of arrow 29 by the spacing of a scan line. The scan beam 7 then scans the next line. Guides 16 and 17 hold the storage screen 4 outside of the scan region. To achieve a constant line spacing, the drive drum is rotated with a constant angular speed. A section through one end of the drive drum 15 used in the system of FIG. 3 is shown in FIG. 4. The drive drum 15 includes a central drive shaft 18 consisting of non-magnetic material, having a bearing pin 19. Ring magnets 20, having a magnetic field in the axial direction, are forced or plugged onto the shaft 18. The ring magnets 20 are laterally limited by pole pieces 21 and 22, which are also forced onto the shaft 18. Spacers 23 and 24 of different lengths hold the magnetic and pole pieces at a desired spacing. This spacing may be different for different types of read-out systems. For example, this spacing may be established by the requirement in some systems that at least the side and the center of the storage screen 4 be held in place for every size of storage screen. It is thus preferable that a magnetic arrangement consisting of ring magnet 20 and pole pieces 21 and 22 be disposed in the middle of the drive drum 15, whereas a plurality, such as two, of such magnetic arrangements being provided at each end of the drive drum 15. The spacing between the magnets in each pair at the end of the drive drum 15 corresponds to the different dimensions of the different types of storage screens which may be used.

These magnetic arrangements and spacers are fixed on the shaft 18 by end clamps 25, one of which is shown in FIG. 4. The clamp 25 may be a nut threaded onto the shaft 18, or may be any other suitable type of plate or washer rigidly connected to the shaft 18.

To increase adhesion of the storage screen 4 to the drive drum 15, the drive drum 15 can be provided with a fill 26 consisting of compressible material, which projects beyond the outer diameter of the pole pieces 21 and 22. This fill 26 can be provided at least in the region between the pole pieces 21 and 22, in which a ring magnetic 20 is also disposed. The fill 26 may, for example, consist of expanded cellular material. The attractive force of the magnetic arrangements acting on the layer 14 of the storage screen 4 compresses the fill 26, so that the fill 26 additionally entrains the storage screen 4 by increasing the friction force.

The annular pole pieces 21 and 22 have a larger diameter than the ring magnets 20. This simplifies manufacture of the magnetic arrangements. The pole pieces 21 and 22 can easily be manufactured with the required outer diameter and with the required smooth surface because a material which is easy to process to achieve that result can be selected for the pole pieces 21 and 22.

Although a single drive drum 15 is shown in the embodiment of FIG. 3, it is possible to use a plurality of such drive drums, for example, to convey the screen 4 from a cassette to the scan region. The use of a plurality of drive drums 15 also enhances the precision of alignment of the storage screen 4. For example, further drive drums can respectively be provided preceding and following the drive drum 15 shown in FIG. 3, at approximately half of the spacing of the dimension of the smallest storage screen 4 which is to used. This insures that the storage screen 4 will always be held by at least two drive drums, thereby preventing a lateral twisting of the screen 4.

Although modifications and changes may be suggested by those skilled in the art, it is the intention of the inventors to embody within the patent warranted hereon all changes and modifications as reasonable and properly come within the scope of their contribution to the art.

We claim as our invention:

1. In a read-out system for a storage luminescent screen including a storage screen having a phosphor layer in which an image is latently stored and a layer consisting of magnetic material, means for line-by-line scanning said phosphor with a source of radiation to induce luminescence of said storage layer pixel-by-pixel, means for collecting and detecting the light generated by the luminescing phosphor layer, and means for converting the detected light into a viewable image, the improvement of a conveyor system for advancing said storage screen through a scan region comprising:

a shaft consisting of non-magnetic material;
   a plurality of ring magnets forced on said shaft;
   a like plurality of pairs of annular pole pieces forced on said shaft, the pole pieces in each pair being respectively disposed on opposite sides of a ring magnet;
   a plurality of spacers on said shaft consisting of non-magnetic material and disposed between said pole pieces alternating with said ring magnets; and
   said shaft, said plurality of ring magnets, said pairs of annular pole pieces and said plurality of spacers in combination forming a magnetic drive drum disposed in said scan region, said magnetic drive drum magnetically interacting with said layer of magnetic material of said storage screen to hold said storage screen in place during a line scan, and said magnetic drive drum being rotatable to advance said screen line-by-line.

2. The improvement of claim 1, wherein said pole pieces have a larger outer diameter than said ring magnets.

3. The improvement of claim 2, further comprising a fill consisting of compressible material disposed at least around said magnets between said pole pieces, said fill projecting beyond said outer diameter of said pole pieces.

* * * * *